(12) United States Patent
Andersen et al.

(10) Patent No.: US 11,828,274 B2
(45) Date of Patent: Nov. 28, 2023

(54) PISTON OF A HYDRAULIC PISTON MACHINE

(71) Applicant: Danfoss A/S, Nordborg (DK)

(72) Inventors: Stig Kildegaard Andersen, Krusaa (DK); Frank Holm Iversen, Padborg (DK); Tommi Kolb, Nordborg (DE)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 18/173,132

(22) Filed: Feb. 23, 2023

(65) Prior Publication Data
US 2023/0279947 A1    Sep. 7, 2023

(30) Foreign Application Priority Data
Mar. 2, 2022   (EP) ..................... 22159767

(51) Int. Cl.
   *F04B 1/126*   (2020.01)
   *F16L 27/04*   (2006.01)
   *F16J 1/04*    (2006.01)

(52) U.S. Cl.
   CPC ............. *F04B 1/126* (2013.01); *F16J 1/04* (2013.01); *F16L 27/04* (2013.01)

(58) Field of Classification Search
   CPC ........ F04B 1/124; F04B 1/26; F04B 27/0886; F01B 3/0085
   See application file for complete search history.

(56) References Cited

U.S. PATENT DOCUMENTS

| | | | |
|---|---|---|---|
| 578,951 A | | 3/1897 | Sullivan |
| 3,783,749 A | * | 1/1974 | Cunningham ........ F01B 1/0644 92/255 |
| 3,861,278 A | * | 1/1975 | Forster ................... F04B 1/124 92/158 |
| 4,216,704 A | * | 8/1980 | Heyl ..................... F01B 3/0085 92/158 |
| 5,392,693 A | | 2/1995 | Engel et al. |
| 5,469,776 A | | 11/1995 | Martensen et al. |
| 5,490,446 A | | 2/1996 | Engel |

(Continued)

FOREIGN PATENT DOCUMENTS

| | | |
|---|---|---|
| EP | 0 763 657 A1 | 3/1997 |
| WO | 2012/104035 A1 | 8/2012 |
| WO | 2021/126828 A1 | 6/2021 |

*Primary Examiner* — Michael Leslie
(74) *Attorney, Agent, or Firm* — McCormick, Paulding & Huber PLLC

(57) ABSTRACT

A piston (1) having a piston shaft (2), a ball head (3) at one end of the piston shaft (2), and a slider shoe (4) mounted to the ball head (3), wherein the ball head (3) has a through channel (5), the slider shoe (4) has a sliding surface (6) and a through hole (7) in communication with an end of the through channel (5), and a plastic material (8) is arranged in a gap between the slider shoe (4) and the ball head (3) and forms an inner coating (9) of the through hole (7). The production of such a piston should be facilitated. To this end a sealing surface (14) is arranged at the end of the through channel (5) wherein the sealing surface (14) surrounds the opening of the through channel (5) into the through bore (7) and an inner diameter of the sealing surface (14) is smaller than an inner diameter of the inner coating (9) of the through bore (7).

18 Claims, 1 Drawing Sheet

(56) References Cited

U.S. PATENT DOCUMENTS

| | | | | |
|---|---|---|---|---|
| 5,601,009 | A * | 2/1997 | Jepsen | F04B 1/0408 92/187 |
| 5,758,566 | A | 6/1998 | Jepsen et al. | |
| 5,947,003 | A * | 9/1999 | Jepsen | F04B 1/126 417/269 |
| 6,318,241 | B1 * | 11/2001 | Stoppek | F04B 1/124 92/260 |
| 6,425,314 | B1 * | 7/2002 | Kleinedler | F04B 1/126 92/155 |
| 6,584,886 | B2 * | 7/2003 | Sugiura | F04B 39/00 92/155 |
| 7,963,209 | B2 * | 6/2011 | Olsen | F04B 1/124 92/57 |
| 9,273,780 | B2 * | 3/2016 | Schnell | F04B 1/126 |
| 10,309,380 | B2 * | 6/2019 | MacHarg | F04B 1/2078 |
| 2012/0148342 | A1 | 6/2012 | Wanke et al. | |
| 2021/0148342 | A1 | 5/2021 | Andersen et al. | |

* cited by examiner

PISTON OF A HYDRAULIC PISTON MACHINE

CROSS-REFERENCE TO RELATED APPLICATION

This application claims foreign priority benefits under 35 U.S.C. § 119 from European Patent Application No. 22159767.7, filed Mar. 2, 2022, the content of which is hereby incorporated by reference in its entirety.

TECHNICAL FIELD

The present invention relates to a piston of a hydraulic piston machine comprising a piston shaft, a ball head at one end of the piston shaft, and a slider shoe mounted to the ball head, wherein the ball head comprises a through channel, the slider shoe comprises an end surface and a through hole in communication with an end of the through channel, and a plastic material is arranged in a gap between the slider shoe and the ball head and forms an inner coating of the through hole.

BACKGROUND

Such a piston is known, for example, from US 2012/0148342 A1.

Such a piston can in particular be used in a water hydraulic machine. A water hydraulic machine uses water as hydraulic fluid. In contrast to oil water has not lubricating characteristics, so that the friction between sliding surfaces must be reduced in another way. In the present case, the friction between the ball head and the slider shoe is reduced by the plastic material.

Such a piston is usually produced in such a way that the slider shoe and the ball head of the piston are assembled, and this assembly is placed in a tool in which the plastic material is injected. In order to guide the plastic material into the gap between the slider shoe and the ball head, a pin is inserted into the piston shaft and through the through channel until it reaches the opening of the through channel. A tip on the pin forms a flow guide for distribution of the molten plastic which is introduced through the through bore.

Such a way of producing the piston is complicated and requires a very precise positioning of all parts of the piston and the tool.

SUMMARY

The object underlying the invention is to facilitate production of a piston of a hydraulic piston machine.

This object is solved in that a sealing surface is arranged at the end of the through channel, wherein the sealing surface surrounds the opening of the through channel into the through bore and an inner diameter of the sealing surface is smaller than an inner diameter of the inner coating of the through bore.

In this way it is possible to insert a pin from the side of the slider shoe opposite the ball head. This pin seals against the sealing surface, so that the molten plastic material cannot enter the through channel. Nevertheless, the molten plastic material can enter the gap between the slider shoe and the ball head and can also form the inner coating of the through bore.

In an embodiment of the invention the sealing surface is of conical form. A conical form makes it easy to centre the pin with respect to the through channel, so that the pin automatically assumes the correct position. Furthermore, the conical form of the sealing surface allows a better connection between the through channel and the through bore even when the slider shoe is tilted with respect to the piston shaft.

In an embodiment of the invention the radially outer diameter of the sealing surface corresponds to a radially inner diameter of the inner coating. The radially inner diameter of the coating may be equal or a bit smaller than the radially outer diameter of the sealing surface. This gives a good transition between the inner coating of the through bore and the plastic material in the gap between the slider shoe and the ball head. To this end, the diameter of the pin is equal or a bi larger than the diameter of the sealing surface.

In an embodiment of the invention the through channel comprises a first section of a reduced inner diameter, wherein the sealing surface is located at an end of the first section. The reduced inner diameter provides space for the sealing surface.

In an embodiment of the invention a second section of the through channel has the same inner diameter as the through bore. More precisely, the inner diameter of the inner coating of the through bore is the same as the inner diameter of the second section. Thus, hydraulic fluid can pass through the through channel and through the through bore without substantial throttling, so that a hydraulic balance on the slider shoe can be achieved. The through bore can have more than the two sections mentioned.

In an embodiment of the invention the through bore comprises an inner radial recess and the inner coating extends into the inner radial recess. Thus, a positive locking between the plastic material and the slider shoe can be achieved.

In an embodiment of the invention the inner radial recess is located at the sliding surface of the slider shoe. This makes it possible to form the inner radial recess with simple means.

In an embodiment of the invention the slider shoe comprises a body, wherein the plastic material extends from the gap to an outer circumference of the body. The plastic material is in one piece giving an enhanced mechanical stability.

In an embodiment of the invention the plastic material covers a front face of the body facing the piston shaft. Thus, a connection between the plastic material in the gap between the slider shoe and the ball head and the material on the outside of the body is formed in a region which is not subject to any frictional forces. A connection between these two parts of the plastic material is thus very stable and durable. The plastic material can be injected from the front face.

In an embodiment of the invention the outer circumference of the body comprises an outer recess and the plastic material extends into the outer recess. Thus, a second form fit between the plastic material and the body of the slider shoe is achieved.

In an embodiment of the invention the outer recess is located at the diameter of the body which is larger than a diameter of the ball head. The larger the diameter of the body where the recess is located is, the stronger is the connection between the plastic material and the body.

In an embodiment of the invention the plastic material on the outside of the body is machined at least on a face opposite the end surface. Thus, the thickness of the slider shoe between the end surface and the face opposite the end surface can be adjusted with a high precision.

In an embodiment of the invention the end surface comprises a sliding element made of a ceramic material. This sliding element can be mounted to the end surface prior to positioning the assembly of slider shoe and piston in the injection tool or the ceramic element can be glued in the end surface of the sider shoe.

In an embodiment of the invention the sliding element is in form of a ring. Thus, the slider shoe can bear against a swash plate with a quite large surface.

In an embodiment of the invention the plastic material is rotatably fixed on the slider shoe. Thus, there is no movement between the plastic material and the slider shoe.

BRIEF DESCRIPTION OF THE DRAWINGS

The invention will now be described in more detail with reference to the drawing, wherein.

DETAILED DESCRIPTION

Figure 1:
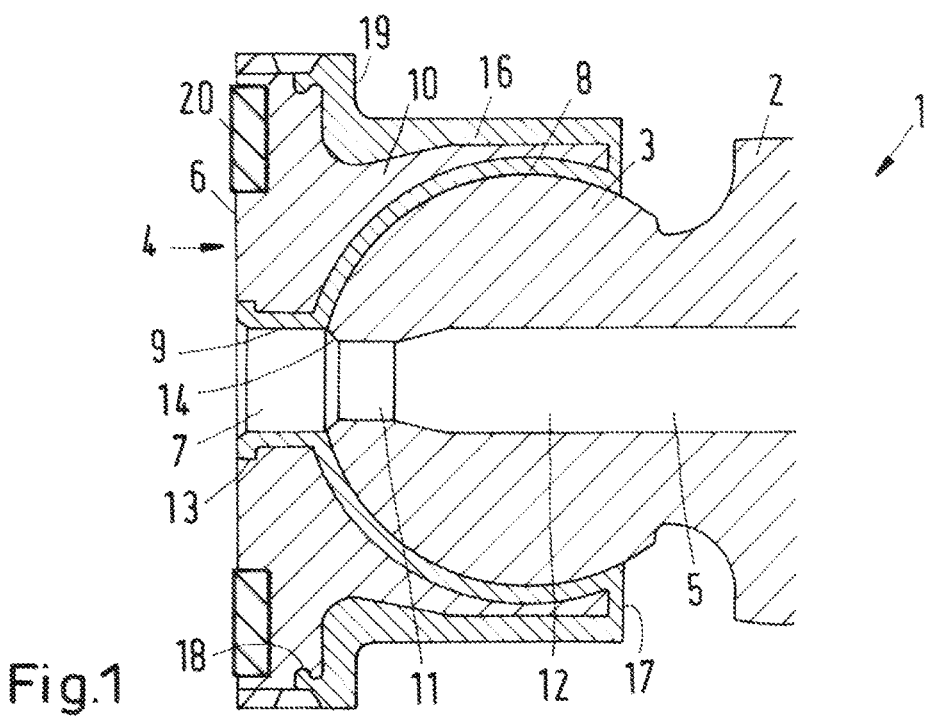
FIG. 1 shows a first embodiment of a part of a piston.

FIG. 1 schematically shows a piston 1 of a hydraulic piston machine. The hydraulic piston machine can be, for example, an axial piston machine.

The piston 1 comprises a piston shaft 2, a ball head 3 at one end of the piston shaft 2, and a slider shoe 4 mounted to the ball head 3. The ball head 3 comprises a through channel 5. The slider shoe 4 comprises an end surface 6 and a through hole 7 in communication with an end of the through channel 5. A plastic material 8 is arranged in a gap between the slider shoe 4 and the ball head 3 and forms an inner coating 9 of the through hole 7.

During operation of the hydraulic piston machine the slider shoe 4 can be tilted with respect to the piston shaft 2, for example, when the piston 1 is moved over a swash plate 21 (FIG. 3) which is inclined with respect to an axis of the piston shaft 2. Hydraulic fluid can be supplied through the through channel 5 and the through bore 7 to produce a hydraulic pressure between the end surface 6 and the swash plate. The size of the end surface 6 is dimensioned such that the slider shoe 4 is loaded with balanced forces.

The slider shoe 4 comprises a body 10, for example made of steel or another similar material. The plastic material 8 has friction reducing properties. A preferred material for the plastic material 8 is PEEK (polyether ether ketone). Other plastic materials can be selected from the group of high-strength thermoplastic plastic material based on poly aryl ether ketones, in particular the already named polyether ether ketones, polyamides, polyacetals, polyaryl ethers, polyethylene terephthalates, polyphenylene sulphides, polysulphones, polyether sulphones, polyether imides, polyamide imide, polyacrylates, phenol resins, such as novolak resins or similar substances, glass, graphite, polytetrafluoroethylene or carbon, especially in fibre form, being used as fullers. When using such materials, it is possible to use water as the hydraulic fluid.

The through channel 5 comprises a first section 11 of a reduced diameter and a second section 12 which has the same inner diameter as the through bore 7, more precisely the inner diameter of the inner coating 9 of the through bore 7. The first section 11 is much shorter than the rest of the through channel 5 and much shorter than the second section 12. Thus, hydraulic fluid flowing through the through channel 5 and the through bore 7 is basically not subjected to any throttling at this position, so that a hydraulic pressure on the end surface 6 can be maintained.

The body 10 comprises an inner radial recess 13. The plastic material of the inner coating 9 extends into the inner radial recess and forms a positive locking with the body 10 of the slider shoe 4. The inner radial recess 13 is located at the end surface 6 of the slider shoe 4. This facilitates production of the radial inner recess 13 by machining. The radial inner recess 13 is accessible from the end surface 6.

A sealing surface 14 is formed at the end of the through channel 5. The sealing surface 14 surrounds the opening of the through channel 5 into the through bore 7 and an inner diameter of the sealing surface 14 is smaller than an inner diameter of the inner coating 9 of the through bore 7.

As can be seen in FIG. 1, the sealing surface 14 is of conical form. The radially outer diameter of the sealing surface 14 corresponds to a radially inner diameter of the inner coating 9.

Figure 2:
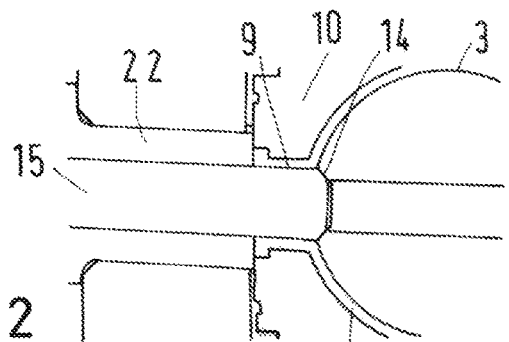
FIG. 2 shows schematically a part of a tool with which the piston can be produced.

The advantage of such a construction will be explained with reference to FIG. 2.

When a piston 1 of the kind described in connection with FIG. 1 is produced, the body 10 of the slider shoe 4 is assembled to the ball head 3. This assembly is placed in an injection tool. A pin 15 is inserted through a metal tube 22 and the through bore 7 until it rests against the sealing surface 14. The diameter of the pin 15 is equal or a bit larger than the outer diameter of the sealing surface 14. A gap is provided between the pin 15 and the body 10, so that the plastic material 8 can be injected around the pin 15 in the through bore 7. The plastic material 8 can, however, not enter the through channel 5, since the pin 15 and the sealing surface 14 together form a bar. The inner coating 9 ensures that there are no side forces on the pin 15 and that the through hole 7 does not have to be very precise, to ensure closing, as the tube 22 rests against the end face 6 and closes.

When the pin 15 has substantially the same outer diameter as the sealing surface 14, a smooth transition between the inner coating 9 and the plastic material 8 in the gap between the ball head 3 and the body 10 can be achieved.

The plastic material 8 extends from the gap to an outer circumference 16 of the body 10. The plastic material 8 covers a front face 17 of the body facing the piston shaft 2. Thus, a connection between the plastic material 8 in the gap between the body 10 and the ball head 3 and the plastic material 8 on the circumference of the body 10 is made in an area which is not subject to any friction, so that this connection is very stable and does not wear. The tube 22 closes against the end surface 6. The plastic material 8 is injected from the front face 17.

The body 10 comprises an outer recess 18 into which the plastic material 8 extends. The plastic material 8 forms a positive locking or form fit with the body 10 at two positions, namely at the inner radial recess 13 and at the outer recess 18. The plastic material 8 is held unrotatably with respect to the body 10 of the slider shoe 4.

The outer recess 18 is located at a diameter of the body 10 which is larger than a diameter of the ball head 3. Thus, the outer recess is located at a quite large diameter which is positive for the holding forces of the plastic material 8 with respect to the body 10 of the slider shoe 4.

The plastic material 8 on the outside of the body 10 comprises a face 19 opposite the end surface 6. The end surface 6 can be provided with a sliding element 20 formed of a ceramic material. The sliding element 20 can be in form of a ring. During operation of a hydraulic axial piston machine a pressure plate 23 acts on this face 19. At least this face 19 is machined, so that the thickness of the slider shoe 4 in this region, i.e. the distance between the sliding surface of the sliding element 20 and the face 19, can be adjusted with a high precision. This makes it possible to apply even pressure to the slider shoe 4.

The piston shaft 2 and the ball head 3 can be made from a metal material, for example steel, as mentioned above, or it can be made from a ceramic material as well.

Figure 3:
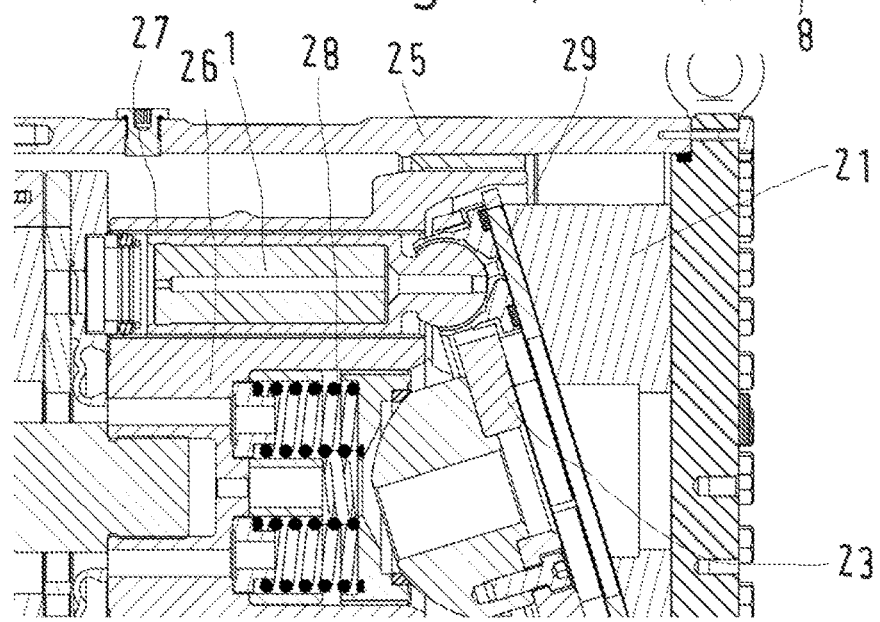
FIG. 3 shows the piston together with other parts of a hydraulic machine.

FIG. 3 shows the piston 1 together with other parts of a hydraulic machine 24. The same elements are denoted with the same reference numerals.

The hydraulic machine 24 comprises a housing 25 in which a cylinder drum 26 is rotationally supported. The cylinder drum 26 comprises a number of cylinders 27. A piston 1 is arranged in each of the cylinders 27, The cylinder drum 26 acts by means of a spring 28 on the pressure plate 23. The pressure plate 23 holds the slider shoes 4 of the pistons 1 against the swash plate 21 which is tilted with respect to an axis of rotation of the cylinder drum 26. The swash plate 21 is made of stainless steel and provided with a ceramic slice 29 on the side against which the slide shoes 4 bear, so that the sliding elements 20 of the shoes 4 run on a swash plate ceramic.

The piston 1 can be made of steel and friction is reduced by the plastic material 8. However, the piston can be made of a ceramic material which is used in connection with the plastic material 8. However, when ceramic material is used, it is possible that ceramic slides against ceramic.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A piston of a hydraulic piston machine comprising a piston shaft, a ball head at one end of the piston shaft, and a slider shoe mounted to the ball head, wherein the ball head comprises a through channel, the slider shoe comprises an end surface and a through bore in communication with an end of the through channel, and a plastic material is arranged in a gap between the slider shoe and the ball head and forms an inner coating of the through bore, wherein a sealing surface is arranged at the end of the through channel, wherein the sealing surface surrounds the opening of the through channel into the through bore and an inner diameter of the sealing surface is smaller than an inner diameter of the inner coating of the through bore.

2. The piston according to claim 1, wherein the sealing surface is of truncated conical form.

3. The piston according to claim 1, wherein the an outer diameter of the sealing surface is equal to or greater than an inner diameter of the inner coating.

4. The piston according to claim 1, wherein the through channel comprises a first section of a reduced inner diameter, wherein the sealing surface is located at an end of the first section.

5. The piston according to claim 4, wherein a second section of the through channel has the same inner diameter as the inner coating of the through bore.

6. The piston according to claim 1, wherein the through bore comprises an inner radial recess and the inner coating extends into the inner radial recess.

7. The piston according to claim 6, wherein the inner radial recess is located at the end surface of the slider shoe.

8. The piston according to claim 1, wherein the slider shoe comprises a body, wherein the plastic material extends from the gap to an outer circumference of the body.

9. The piston according to claim 8, wherein the plastic material covers a front face of the body facing the piston shaft.

10. The piston according to claim 8, wherein the outer circumference of the body comprises an outer recess and the plastic material extends into the outer recess.

11. The piston according to claim 10, wherein the outer recess is located at a diameter of the body which is larger than a diameter of the ball head.

12. The piston according to claim 8, wherein the plastic material on the outer circumference of the body is machined at least on a face opposite the end surface.

13. The piston according to claim 1, wherein the end surface comprises a sliding element made of a ceramic material.

14. The piston according to claim 13, wherein the sliding element is in form of a ring.

15. The piston according to claim 1, wherein the plastic material is rotatably fixed on the slider shoe.

16. The piston according to claim 2, wherein the an outer diameter of the sealing surface is equal to or greater than an inner diameter of the inner coating.

17. The piston according to claim 2, wherein the through channel comprises a first section of a reduced inner diameter, wherein the sealing surface is located at an end of the first section.

18. The piston according to claim 3, wherein the through channel comprises a first section of a reduced inner diameter, wherein the sealing surface is located at an end of the first section.

* * * * *